United States Patent
Molenaar

[15] 3,692,745
[45] Sept. 19, 1972

[54] METHOD FOR CHEMICALLY MODIFYING THREAD-FORMING POLYESTERS

[72] Inventor: Eenje Molenaar, Dieren, Netherlands

[73] Assignee: Akzona Incorporated, Asheville, N.C.

[22] Filed: Jan. 19, 1971

[21] Appl. No.: 107,858

[30] Foreign Application Priority Data

Jan. 24, 1970  Netherlands..............7001022

[52] U.S. Cl. ...............................260/75 T, 260/75 N
[51] Int. Cl. ..............................................C08g 17/14
[58] Field of Search ...........................260/75 T, 75 N

[56] References Cited

UNITED STATES PATENTS 3,193,522   7/1965   Neumann et al. ........260/45.9
3,300,447   1/1967   Thoma et al.................260/75

*Primary Examiner*—Melvin Goldstein
*Attorney*—Francis W. Young

[57] ABSTRACT

A method for the chemical modification of a thread-forming polymeric polyester containing carboxyl end groups, which comprises treating the molten polyester with an unsaturated organic compound capable of reacting with said carboxyl end groups, the compound having one or two

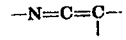

structural units which react with carboxyl end groups to form imide bonds therein.

6 Claims, No Drawings

METHOD FOR CHEMICALLY MODIFYING THREAD-FORMING POLYESTERS

This invention relates to the chemical modification of thread-forming polymeric polyesters by treating a molten polyester with an unsaturated organic nitrogen-containing compound capable of reacting with the polyester end groups and more particularly, to a method for reducing the free carboxyl group concentration in such polymeric polyesters.

Advantageously, one aspect of the method of this invention is concerned with maintaining or even increasing the viscosity of the treated polyester. In this regard, reference is made to Netherlands Pat. application No. 6,814,541, which describes the application of epoxyester compounds for this purpose.

Especially from the viewpoint of reactivity, it is preferred that unsaturated compounds should be used to effect the desired chemical modification of polyesters. However, previously proposed unsaturated compounds often have drawbacks. The stabilization of polyesters, particularly against hydrolytic decomposition by the application of mono and polycarbodiimides is known from inter alia, U.S. Pat. Nos. 3,193,522 and 3,193,523. However, it has been found that monocarbodiimide compounds are not very stable and cause discoloration of the polyester. Use of bis-carbodiimides is not attractive from the viewpoint of preparation and because if these bis-compounds are stable at all, they suffer from insufficient reactivity. Although stabilizer additives should be free of catalysts, polycarbodiimides are often difficult to purify.

It is also known from the Belgian Pat. No. 553,273 (and the corresponding Canadian Pat. No. 566,076) to subject polyesters to chemical modification by treatment with ketenes and diketenes. The ketenes in this case serve to reduce the concentration of hydroxyl groups. However, for the purpose of reducing the concentration of carboxyl groups, it has been found that the use of ketenes is not very suitable, since the ketenes and carboxyl groups react to form anhydride groups which cause the polyester to remain susceptible to hydrolysis.

In accordance with this invention, certain unsaturated nitrogen-containing organic compounds have now been found which do not show the drawbacks of the known chemical modifiers of polyesters.

Thus this invention contemplates a method for reducing the concentration of carboxyl groups in thread-forming polymeric polyesters which comprises treating the polyester in a molten condition with a compound having one or two structural units of the formula:

$$-N=C=C-$$
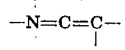

which react with the carboxy groups to form imide bonds.

Upon reaction with the molten polyester the organic compounds with one structural unit according to the invention (i.e. monoketenimines) effectively reduce the free carboxyl group concentration. Compounds with two structural units (i.e. bis-ketenimines) offer the additional advantage of chain lengthening. This lengthening of the polymer chain is an excellent way to prevent the decrease in polymer viscosity which usually occurs in melt-processing of polyesters. Dependent on the extent to which it is desired to influence the viscosity, the polyester may be reacted with, respectively, a monoketenimine, a bis-ketenimine, or with a mixture of the two.

In accordance with this invention, the aforementioned structural unit in the ketenimines used must react with a carboxylic end group, —R·COOH, to form an imide addition product, —R·CO·N— CO·CH— which provide an imide bond within the polymer. The formation of this reaction product is considered essential for the purpose of this invention. Just as in the case of chemical modification of polyesters with the aforementioned ketenes, ketenimines which react with carboxylic end groups to form an anhydride are unsuitable for this invention. For example, reaction of N-2-cyano-2 propyl-dimethyl ketenimine to form an anhydride is known and described in the Journal of the American Chemical Society, Vol. 87, page 524, published in 1965.

The use of approximately one equivalent, of the ketenimine additive or less (e.g. about 0.4 equivalent) per equivalent of carboxyl groups present in the polymer is, in general, sufficient to obtain, within a few minutes, (e.g. from about 5 to about 20 minutes for molten polyethylene terephthalate at about 250° to 320° C.) a drastic reduction of the carboxyl group concentration as compared with that in a non-modified polymer. Higher amounts of the additive may, of course, be employed. Usually not more than about 3 equivalents of the ketenimine are used per equivalent of carboxyl groups. A suitable method of treatment comprises rolling the polyester chips with a suitable ketenimine in the form of powder, followed by melting. The reaction time required is so short that the melting need not last longer than the normal melting phase in the processing of polyester chips into shaped articles, more particularly melt-spinning.

The monoketenimines used for the purposes of this invention may be represented by the general formula:

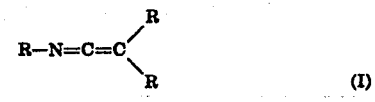

wherein R represents the same or different organic radicals selected from the group consisting of alkyl groups containing from one to 10 carbon atoms and aromatic hydrocarbon groups containing from six to 12 carbon atoms. Preferably, aromatic groups such as phenyl are used. A simple and suitable monoketenimine of this type is, for instance diphenyl-ketene-N-phenylimine. Suitable methods for the preparation of monoketenimines are described in, inter alia, the Journal of Organic Chemistry, Vol. 29 pages 34–37, published in 1964 and Justus Liebigs Annalen Der Chemie, Vol. 718, pages 24–32, published in 1968.

The suitable bis-ketenimines may be represented by the following two general formulas:

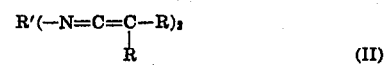

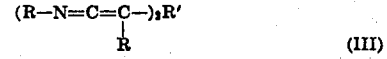

wherein R again stands for the same or different organic, preferably aromatic radicals represented by R in formula I. It is understood that the non-bracketed R' is the corresponding divalent organic hydrocarbon radical, i.e. an arylene or alkylene group.

The methods of preparation for the bis-ketenimines are the same as those given in the aforementioned publications for monoketenimines. In the case of formula II the starting material may be an acid amide from a monocarboxylic acid and a diamine or diisocyanate; in the case of the ketenimines represented in formula III use may be made of an acid amide from a dicarboxylic acid and a monoamine or monoisocyanate.

Especially from the viewpoint of preparation, it is preferred to use the bis-ketenimines according to formula II for the method of this invention.

Thus, combined with the ketenimines of formula I, compounds particularly useful for working the method of the invention are those having the general formula:

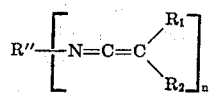

(IV)

where $R_1$ and $R_2$ are the same or different aliphatic or aromatic radicals, i.e. the aliphatic radicals are alkyl groups containing from one to 10 carbon atoms, and the aromatic radicals are aryl groups containing from six to 12 carbon atoms, $n$ is an integer from 1 to 2, and $R''$ is one of the aryl or alkyl groups represented by $R_1$ and $R_2$ when $n$ is 1, and the corresponding arylene or alkylene group when $n$ is 2. In particular, the diphenylketenimines appeared to be especially satisfactory.

This invention also is directed to the manufacture of fibers and threads by the melt-spinning of polyesters modified chemically with the ketenimines represented by formulas I to IV, to the fibers and threads thus obtained, and particularly to the tire yarn manufactured from such fibers and threads.

The fiber-forming polymeric polyesters of this invention are saturated substantially linear polycondensation products which contain free carboxyl end groups (—COOH). When melt-spun these polyesters often have a concentration of free carboxyl groups of 20 or more milliequivalents per kilogram of polymer. This high concentration makes the polymer temperature-sensitive and susceptible to hydrolysis. The preferred polyesters are high-melting polyethylene terephthalates obtained by the well known process of transesterification or ester alcoholysis between glycol and dimethylterephthalate. Other polyesters obtained by reacting lactones or aromatic dicarboxylic acids or esters thereof, particularly the methyl esters and mixtures of the esters, with an appropriate glycol or diol may also be treated to reduce their carboxyl group concentration.

The invention will be further described in the following examples:

EXAMPLE I

A number of standard fiber-forming polyethylene terephthalates are in the usual manner manufactured by transesterification of dimethyl terephthalate with ethylene glycol, followed by polycondensation of the ester interchange product. The polymer melt is extruded and, after solidification, cut into chips. If desired, the viscosity may be raised by subjecting the polymer to after-condensation.

Each of the standard polymers are analyzed for relative viscosity (measured at 25° C. on a 1 percent by weight solution of the polymer in metacresol) and free carboxyl group concentration. This concentration (measured in milliequivalents per kilogram of polymer) is determined by titration of a solution of the polymer in a mixture of o-cresol and chloroform with an alcoholic KOH-solution, the end-point being determined spectrophotometrically using bromphenol blue as indicator. These polymers were found to have the following properties:

|  | Carboxyl Concentration (meq/kg) | Relative Viscosity |
| --- | --- | --- |
| Standard polymer $P_1$ | 11.7 | 2.06 |
| Standard polymer $P_2$ | 12.9 | 2.06 |
| Standard polymer $P_3$ | 13.0 | 1.52 |

EXAMPLE II

In this Example, several different ketenimines are synthesized in conformity with the method described by Bestmann et al. in Liebigs Annalen Der Chemie, Vol. 718, page 24, published in 1968, the starting materials used were N-substituted amides and triphenylphosphine, bromine and triethylamine in dichloromethane.

The ketenimines prepared for use in the subsequent experiments are indicated as follows:

| Compound | Table Abbreviation |
| --- | --- |
| diphenylketene-N-phenylimine | mono |
| N,N'-bis(diphenylketene) p-phenylenediimine | bis 1 |
| N,N'-bis(diphenylketene) 4,4'diphenyl methanediimine | bis 2 |
| N,N'-bis(diphenylketene) hexamethylenediimine | bis 3 |

EXAMPLE III

Dried polymer chips of each of the standard polymers $P_1$ and $P_3$ are melted in a nitrogen atmosphere at a temperature of from about 250° to 265° C., followed by the addition of a suitable ketenimine additive and stirring for 10 minutes. Thereupon the polymer is discharged and analyzed for carboxyl concentration and relative viscosity.

For the purpose of comparison another quantity of chips is subjected to the same treatment, except that no ketenimine additive is added.

| Experiment No. | Polymer Used | Ketenimine Additive Employed | | | Properties of Polymer | |
| --- | --- | --- | --- | --- | --- | --- |
| | | (type) | (meq/kg) | (wt%) | carboxyl[a] concentration (meq/kg) | relative[a] viscosity |
| 1 | $P_1$ | — | — | — | 19.5 | 1.88 |
| 2 | $P_1$ | mono | 20 | 0.53 | 10.9 | 1.86 |
| 3 | $P_1$ | mono | 40 | 1.07 | 1.4 | 1.84 |
| 4 | $P_1$ | bis 1 | 20 | 0.46 | 11.0 | 1.93 |
| 5 | $P_3$ | — | — | — | 21.9 | 1.50 |
| 6 | $P_3$ | bis 1 | 25 | 0.62 | 5.2 | 1.56 |
| 7 | $P_3$ | bis 2 | 20 | 0.55 | 9.1 | 1.58 |
| 8 | $P_3$ | bis 2 | 40 | 1.10 | 5.4 | 1.59 |

| 9 | P₃ | bis 3 | 40 | 1.00 | 13.0 | 1.53 |

[a] as determined in Example I

From the table it can be seen that the ketenimines of this invention are very effective in decreasing the carboxyl concentration of the polyester. An additional advantage of the bis-ketenimines is that they lead to an increase in viscosity.

It should be added that in production on an industrial scale the effect of the invention will be even more pronounced than in the afore-described melting experiments. This pronounced difference is due to the way in which the ketenimine in these experiments is added to and mixed with the polymer. In the present experiments the ketenimine is partially lost by sublimation. In addition, mixing of the ketenimine additive with the high-viscous molten material proceeds rather poorly.

EXAMPLE IV

This example illustrates the chemical modification of polyesters using different amounts of the reactants and mixing at different temperatures in a spinning process. In a rotating drum a quantity of 20 kilograms of polymer chips is dried at 160° C., allowed to cool down to 60° C. after which a total amount of 50 grams of the monoketenimine additive prepared in Example II is added. In another identical experiment 50 kilograms of the polymer is cooled to 100° C. and then mixed with 150 grams of the bis 1 ketenimine additive prepared in Example II. After continued rotation for some hours, the chips in each experiment are melted, after which the molten polymer is in each case transported by a screw pump to a spinning assembly to be extruded in the form of threads. The spun products are analyzed for carboxyl concentration and relative viscosity, and the values found are compared with those for threads that have been manufactured in the same manner, but without the addition of the ketenimine additives.

The results obtained are summarized in the table below:

| Experiment No. | Polymer Used | Ketenimine Additive Employed | | | Properties of Polymer | |
|---|---|---|---|---|---|---|
| | | (type) | (meq/kg) | (wt%) | carboxyl[a] concentration (meq/kg) | relative[a] viscosity |
| 10 | P₁ | — | — | — | 23–24 | 1.85 |
| 11 | P₁ | mono | 9.3 | 0.25 | 14–15 | 1.83 |
| 12 | P₂ | — | — | — | 25.0 | 1.82 |
| 13 | P₂ | bis 1 | 13 | 0.30 | 13.8 | 2.05 |

[a] as determined in Example I

What is claimed is:

1. A method for the chemical modification of a thread-forming polyester containing carboxyl end groups, which comprises treating the molten polyester with an unsaturated organic compound capable of reacting with said carboxyl end groups, said compound being a ketenimine selected from the group consisting of:

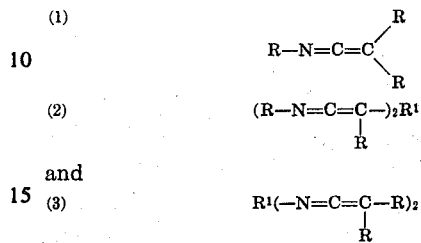

and (3)     R¹(—N=C=C—R)₂
              |
              R wherein R represents a same or different organic radical selected from the group consisting of alkyl groups containing from one to 10 carbon atoms and aromatic hydrocarbon groups containing from six to 12 carbon atoms; R' is a divalent organic radical selected from the group consisting of arylene and alkylene radicals.

2. Fibers and threads manufactured by the method of claim 1.

3. A method for the chemical modification of a thread-forming polyester containing carboxyl end groups, which comprises treating the molten polyester with an unsaturated organic compound capable of reacting with said carboxyl end groups, said compound being a ketenimine of the formula:

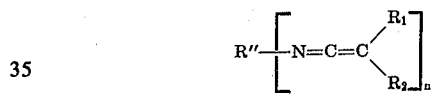

wherein $R_1$ and $R_2$ are the same or different organic radicals selected from the group consisting of alkyl radicals containing from one to 10 carbon atoms and aromatic hydrocarbon radicals containing from six to 12 carbon atoms, $n$ is an integer from 1 to 2, and R'' is an organic radical selected from the group consisting of said alkyl and aryl groups when $n$ is 1, and selected from the group consisting of arylene groups containing from six to 12 carbon atoms and alkylene groups containing from one to 10 carbon atoms when $n$ is 2.

4. The method of claim 3 in which $n$ is 2 and $R_1$ and $R_2$ are both aromatic radicals.

5. The method of claim 4 in which $R_1$ and $R_2$ are phenyl groups.

6. The method of claim 4 in which approximately 0.4 to 3 equivalents of said structural units, are reacted with one equivalent of said carboxyl end groups at temperatures of from about 250° to 320° C.

* * * * *